US 8,588,609 B2

(12) United States Patent
Hiraizumi

(10) Patent No.: US 8,588,609 B2
(45) Date of Patent: Nov. 19, 2013

(54) WAVELENGTH DIVISION MULTIPLEXING TRANSMISSION SYSTEM AND APPARATUS AND OPTICAL SIGNAL NOISE RATIO CALCULATION METHOD

(75) Inventor: Maki Hiraizumi, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 648 days.

(21) Appl. No.: 12/559,376

(22) Filed: Sep. 14, 2009

(65) Prior Publication Data

US 2010/0226661 A1 Sep. 9, 2010

(30) Foreign Application Priority Data

Mar. 3, 2009 (JP) .................. 2009-049836

(51) Int. Cl.
*H04J 14/02* (2006.01)
(52) U.S. Cl.
CPC ............. *H04J 14/02* (2013.01); *H04J 14/0219* (2013.01)
USPC .............................. 398/30; 398/26

(58) Field of Classification Search
USPC ........................................... 398/26
See application file for complete search history.

(56) References Cited

U.S. PATENT DOCUMENTS

| 6,445,471 B1 * | 9/2002 | Shimokawa et al. ........... 398/79 |
| 2003/0163555 A1 * | 8/2003 | Battou et al. ................. 709/223 |
| 2006/0285846 A1 * | 12/2006 | Uekama et al. ................ 398/30 |

FOREIGN PATENT DOCUMENTS

JP 2009-049836 4/2008

* cited by examiner

*Primary Examiner* — Danny Leung
(74) *Attorney, Agent, or Firm* — Ladas & Parry, LLP

(57) ABSTRACT

A wavelength division multiplexing (WDM) transmission system for transmitting a wavelength division multiplexed signal light from a sender transmission apparatus to a receiver transmission apparatus is provided. The system comprises a computing unit that subtracts from a first optical signal noise ratio (OSNR) of the signal light measured by the receiver transmission apparatus a second OSNR ascribed to a sideband of the signal light measured by the sender transmission apparatus so as to compute a corrected OSNR of an amplified spontaneous emission (ASE) noise light with a reduction of an effect of the sideband.

14 Claims, 18 Drawing Sheets

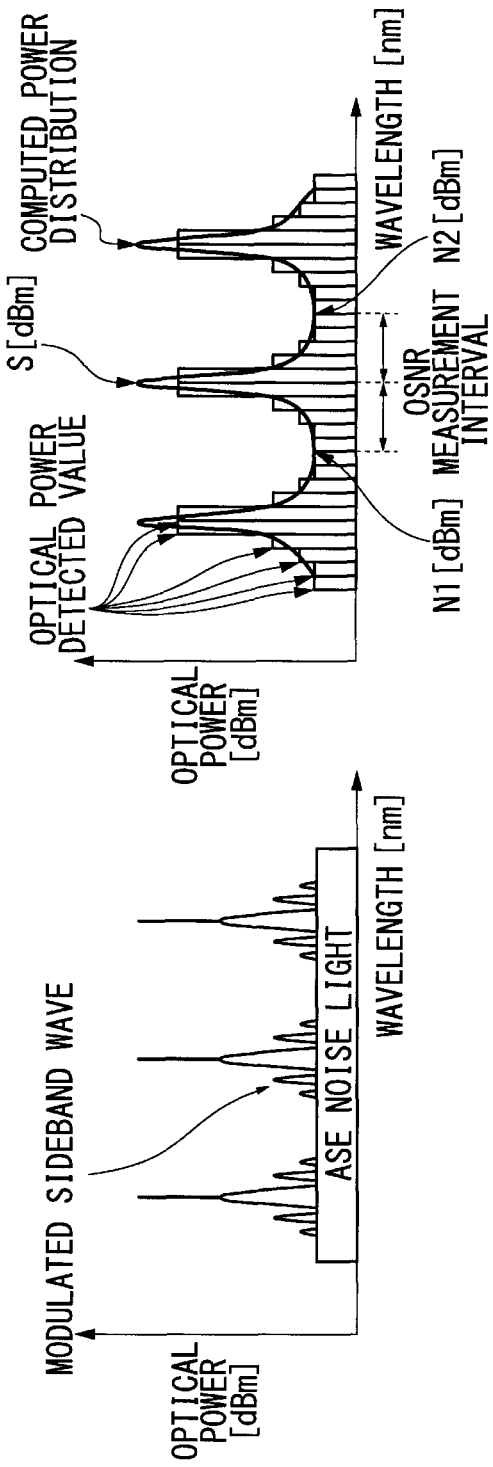

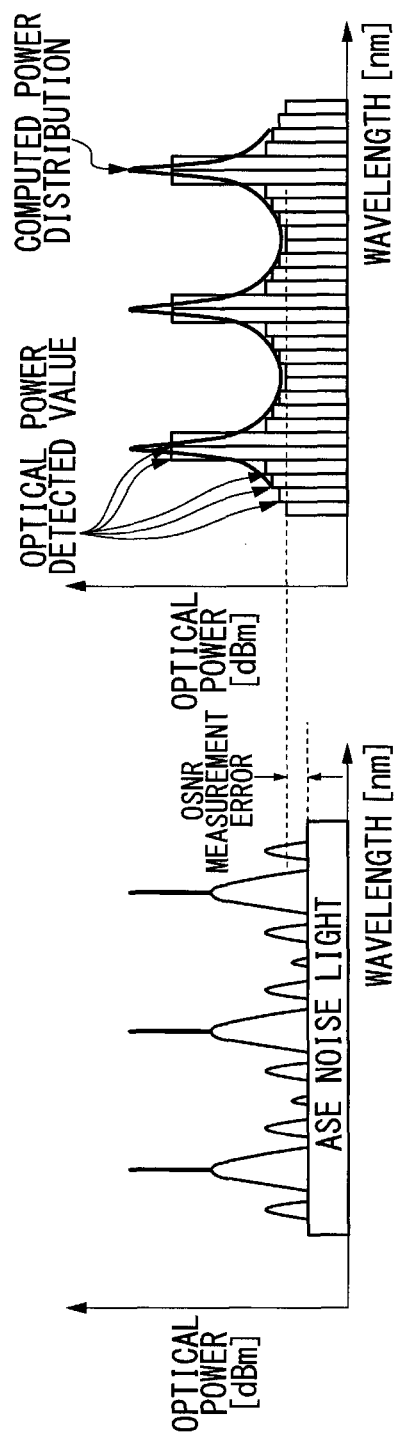

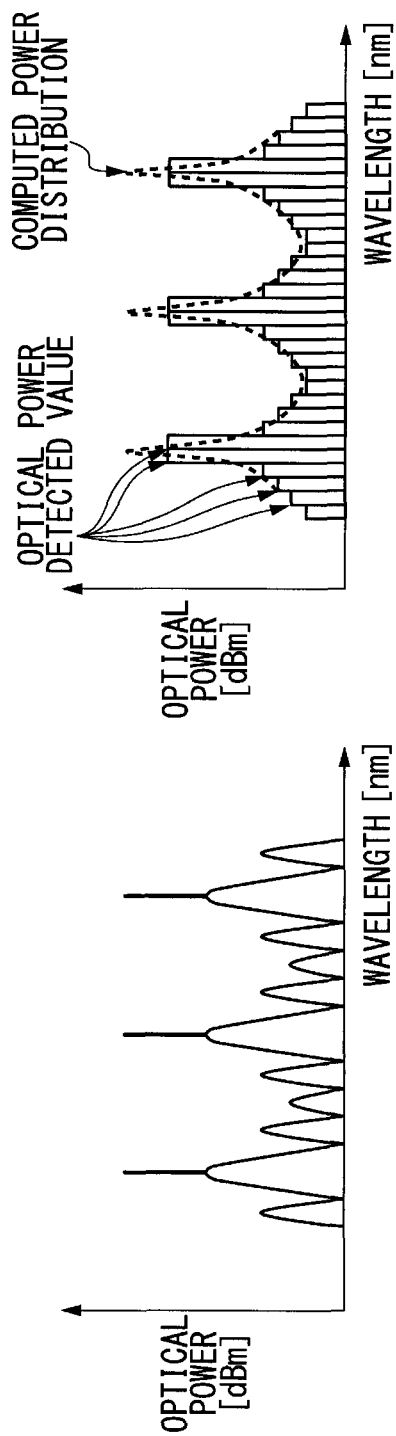

WAVELENGTH DIVISION MULTIPLEXING TRANSMISSION SYSTEM AND APPARATUS AND OPTICAL SIGNAL NOISE RATIO CALCULATION METHOD

BACKGROUND OF THE INVENTION

1. Field of the Invention

The present invention relates to a wavelength division multiplexing transmission system, a wavelength division multiplexing transmission apparatus, and an optical signal noise ratio calculation method used for the system and apparatus.

2. Description of the Related Art

Due to an increased volume of communicated information, a high capacity and low cost optical fiber communication system has been developed. In such a system, a wavelength division multiplexing (WDM) method for multiplexing multiple wavelengths and transmitting the multiplexed signal has been adopted and the degree of wavelength-multiplexing tends to increase higher and higher in recent years.

Channel spacing, an index of the degree of wavelength-multiplexing, has been standardized by the International Telecommunications Union Telecommunications Standardization Sector (ITU-T). It is known that a standard WDM system wavelength-multiplexes a signal whose the signal transmission capacity per one channel is a 10-gigabit per second (Gbps) with a 100-gigahertz (GHz) (approximately 0.8 nano meters (nm)) spacing or a 50-GHz (approximately 0.4 nm) spacing.

In WDM systems, an erbium doped fiber amplifier (EDFA) is commonly used as a repeater to offset optical fiber line loss. In a system employing EDFA, amplified spontaneous emission (ASE) is generated becoming noise causing bit error rate (BER) increases. As such, the optical signal noise ratio (OSNR) evaluation becomes important.

Since the WDM system transmits multiple channels simultaneously, the OSNR for the receiving end (after transmission) of each channel differs for each channel. Additionally, the BER of each channel also varies. As such, the quality of transmission among channels becomes unequal. Hence, to optimize the transmission level of each channel such that the transmission quality becomes equivalent, a pre-emphasis method is commonly employed.

In the pre-emphasis process, since the level of each channel on the transmission side is determined based on the OSNR, the OSNR must be accurately measured. A method for measuring the spectrum of the signal and the ASE component by using a spectrum analyzer and calculating the OSNR based on the measurement results provides a relatively high accuracy.

The following patent document proposes an OSNR measurement apparatus and an OSNR measurement method that can accurately measure the OSNR in an optical fiber communication of high bit rate and high-density channel spacing.
[Patent document 1] Japanese Patent Application Laid-Open Publication No. 2008-85883.

In recent years, due to an increasing demand for a much larger amount of the transmission capacity, the transmission wavelength becomes narrower and the bit rate of the transmission wavelength becomes still higher. Hence, it is hard to acquire a wavelength point where only the noise component can be measured without suffering from the effect of the modulated sideband component of the transmission signal so that an accurate noise optical power cannot be obtained. Thus there exists such a problem that the OSNR cannot be accurately measured under these circumstances.

SUMMARY OF THE INVENTION

In this background, a general purpose of the present invention is to provide a transmission system or the like that can measure the OSNR accurately.

One embodiment of the present invention relates to a wavelength division multiplexing (WDM) transmission system for transmitting a wavelength division multiplexed signal light from a sender transmission apparatus to a receiver transmission apparatus. The system comprises: a computing unit that subtracts from a first optical signal noise ratio (OSNR) of the signal light measured by the receiver transmission apparatus a second OSNR ascribed to a sideband of the signal light measured by the sender transmission apparatus so as to compute a corrected OSNR of an amplified spontaneous emission (ASE) noise light with a reduction of an effect of the sideband.

Preferably, the sender transmission apparatus may comprise a wavelength multiplexer that wavelength-multiplexes the signal light; and an optical amplifier that amplifies the signal light wavelength-multiplexed by the wavelength-multiplexer. The sender transmission apparatus may measure the second OSNR from the signal light branched between the wavelength multiplexer and the optical amplifier and may notify the measured second OSNR to the receiver transmission apparatus.

Preferably, the receiver transmission apparatus may comprise a WDM monitor that measures the first OSNR of the signal light. The WDM monitor may subtract from the first OSNR the second OSNR notified from the sender transmission apparatus.

Preferably, the sender transmission apparatus may transmit the second OSNR to the receiver transmission apparatus via a transmission channel for transmitting the signal light.

The receiver transmission apparatus may comprise: a WDM monitor that measures the first OSNR of the signal light; and a monitor/control unit that is connected to a communication network. The monitor/control unit may subtract from the first OSNR provided by the WDM monitor the second OSNR notified by the sender transmission apparatus.

Preferably, the sender transmission apparatus may transmit the second OSNR to the receiver transmission apparatus via the communication network.

Preferably, the sender transmission apparatus may comprise: a measuring unit that measures the OSNRs' that contains the ASE component of an optical amplifier based on an output signal light of the optical amplifier, which amplifies the wavelength multiplexed signal; and a computing unit that subtracts from the measured OSNRs' an OSNRs" that corresponds to the ASE component of the optical amplifier, which is obtained beforehand, so as to compute the second OSNR.

Preferably, the sender transmission apparatus may comprise: a WDM monitor that measures the OSNRs' of the output signal light branched from an output terminal of the optical amplifier; and a storage unit that stores the OSNRs".

Preferably, the OSNRs" may be a value measured beforehand and stored in the storage unit at the time of manufacturing the optical amplifier.

Preferably, the storage unit may store OSNRs"n_min and OSNRs"n_max measured beforehand. The sender transmission apparatus computes the OSNRS" based on the OSNRs"n_min and OSNRs"n_max stored in the storage unit. The OSNRs"n_min and the OSNRs"n_max are the values of the OSNR of channel n measured at an output terminal of the optical amplifier when a light source of a wavelength of the channel n is input to the optical amplifier at a minimum input optical power and a maximum input optical power, respectively.

Another embodiment of the present invention relates to an optical signal noise ratio calculation method employed in a wavelength division multiplexing (WDM) transmission system for transmitting a wavelength division multiplexed signal light from a sender transmission apparatus to a receiver transmission apparatus. The method comprises: measuring a first optical signal noise ratio (OSNR) of the signal light in the receiver transmission apparatus; measuring a second OSNR ascribed to a sideband of the signal light in the sender transmission apparatus; and subtracting the second OSNR from the first OSNR so as to compute a corrected OSNR of an amplified spontaneous emission (ASE) noise light with a reduction of an effect of the sideband.

Preferably, the method may further comprises: measuring the second OSNR from the signal light branched between a wavelength multiplexer and an optical amplifier in the sender transmission apparatus, the wavelength multiplexer wavelength-multiplexing the signal light, the optical amplifier amplifying the signal light wavelength-multiplexed by the wavelength-multiplexer; and notifying the measured second OSNR to the receiver transmission apparatus.

Yet another embodiment of the present invention relates to a wavelength division multiplexing (WDM) transmission apparatus for transmitting a wavelength division multiplexed signal light. The apparatus comprises: a wavelength multiplexer that wavelength-multiplexes a signal light; an optical amplifier that amplifies the signal light wavelength-multiplexed by the wavelength multiplexer; an optical branching unit that branches the signal light between the wavelength multiplexer and the optical amplifier; and a WDM monitor that measures an optical signal noise ratio of the signal light branched by the optical branching unit. The apparatus notifies the optical signal noise ratio measured by the WDM monitor to a destination of the signal light.

Yet another embodiment of the present invention relates to a wavelength division multiplexing (WDM) transmission apparatus for transmitting a wavelength division multiplexed signal light. The apparatus comprises: an optical amplifier that amplifies a transmitted signal light; an optical branching unit that branches the signal light amplified by the optical amplifier; and a WDM monitor that measures a first optical signal noise ratio (OSNR) of the signal light branched by the optical branching unit. The apparatus subtracts from the first OSNR measured by the WDM monitor a second OSNR ascribed to a sideband of the signal light provided from the source of the signal light so as to compute an OSNR of an ASE noise light with a reduction of an effect of the sideband.

BRIEF DESCRIPTION OF THE DRAWINGS

Embodiments will now be described by way of examples only, with reference to the accompanying drawings, which are meant to be exemplary, not limiting and wherein like elements are numbered alike in several Figures in which:

FIGS. 8A and 8B illustrate a typical example of how to compute OSNR from a computed optical power distribution;

FIGS. 10A and 10B illustrate the OSNR measurement error ascribed to the high bit rate;

FIGS. 11A and 11B illustrate OSNRsn information detected by a transmission apparatus at a sending site;

DETAILED DESCRIPTION OF THE INVENTION

The invention will now be described by reference to the preferred embodiments. This does not intend to limit the scope of the present invention, but to exemplify the invention.

Figure 2:
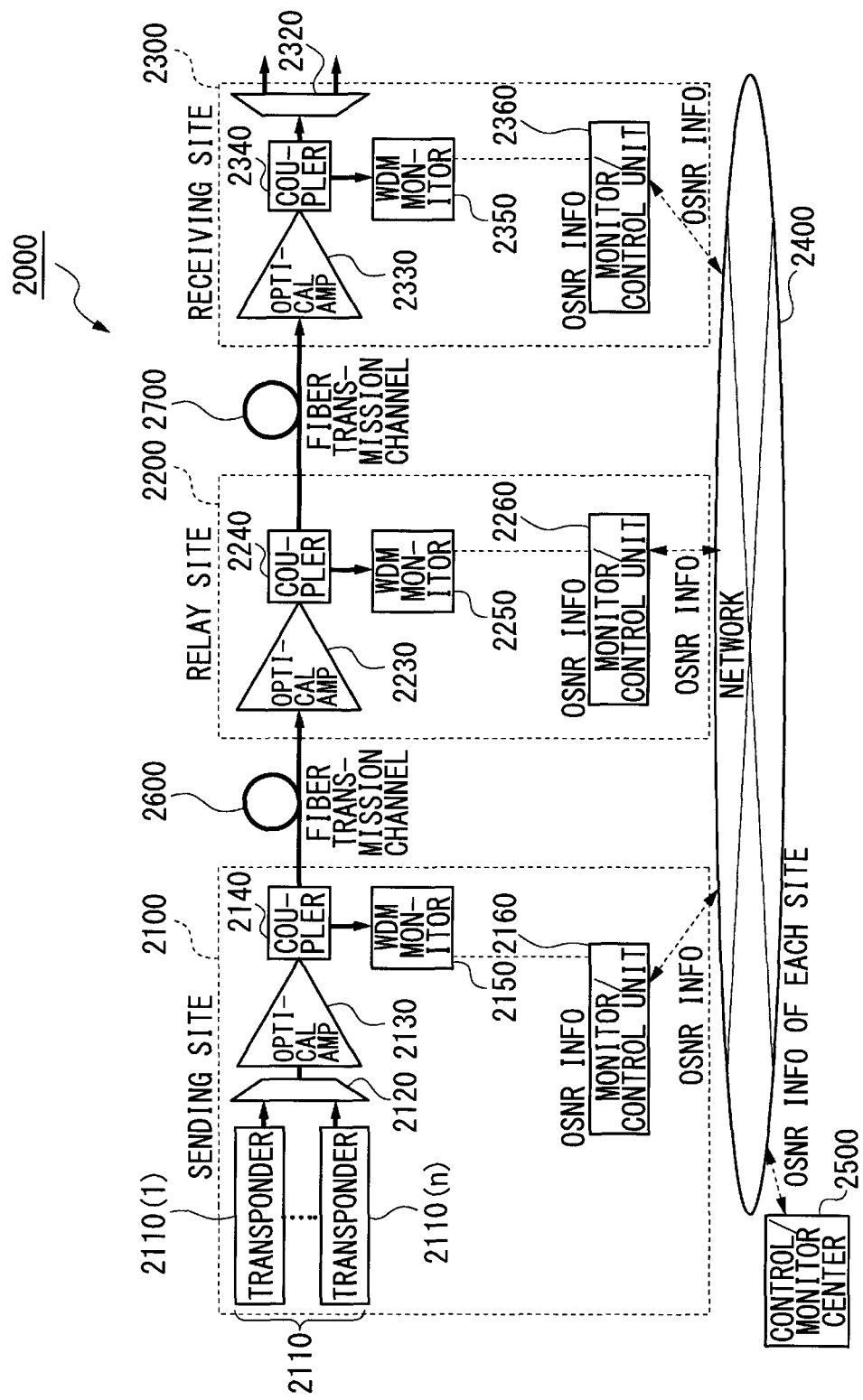
FIG. 2 is a block diagram illustrating a WDM transmission system that transmits a signal light having no control/monitor light.
Figure 3:
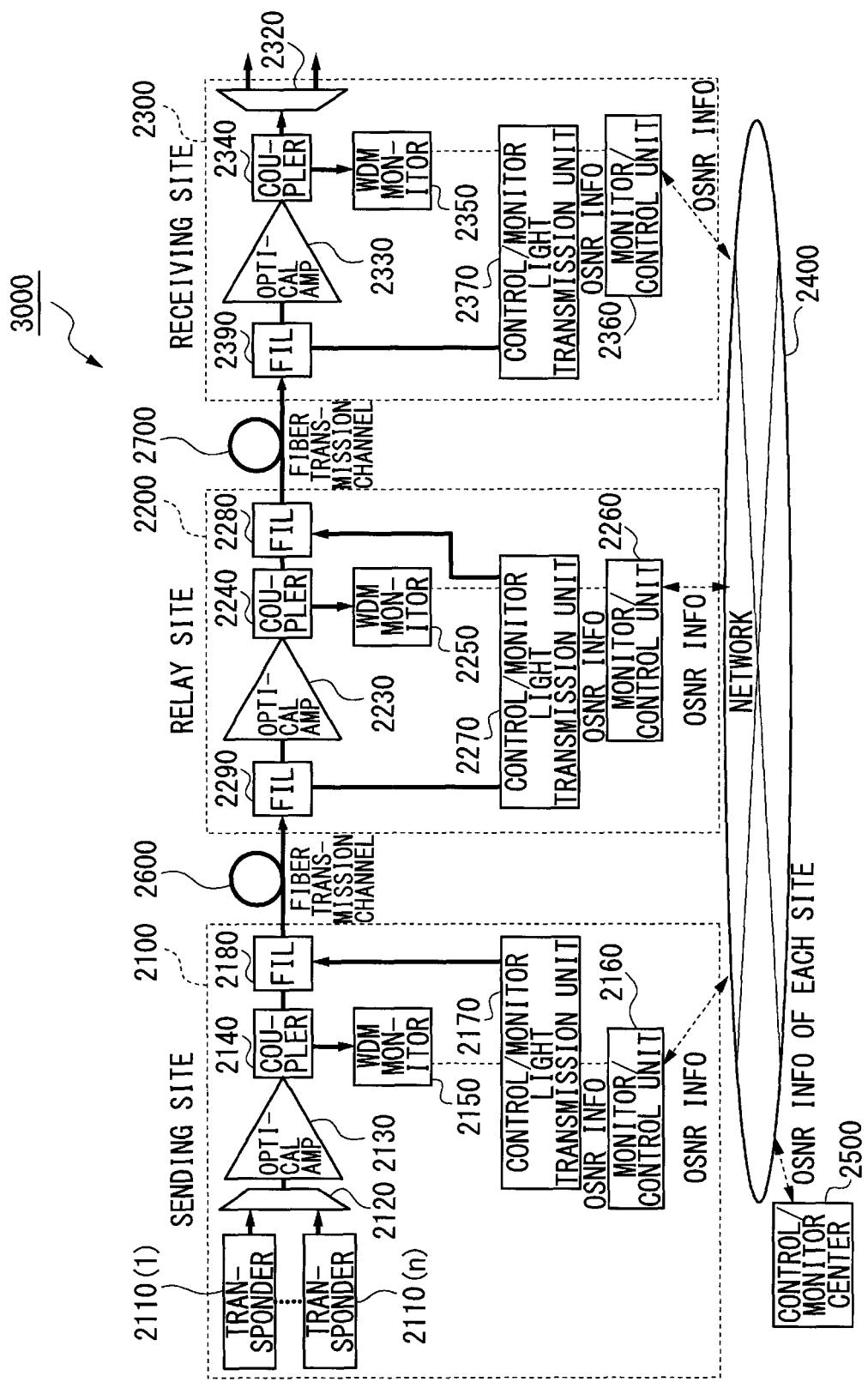
FIG. 3 is a block diagram illustrating a structure of a WDM transmission system that transmits a signal light having a control/monitor light.

Before explaining some characteristic structures of the embodiments, the structure and function of the WDM transmission system is briefly explained. FIG. 2 and FIG. 3 show a structural example of the WDM transmission system that handles the wavelength-multiplexed signal as shown in FIGS. 1A and 1B. FIG. 1A is a conceptual diagram illustrating a typical example of the wavelength-multiplexed signal light spectrum when a control/monitor light (it is also referred to as a control/monitor channel) does not exist. FIG. 1B is a conceptual diagram illustrating a typical example of the wavelength-multiplexed signal light spectrum when a control/monitor light exists.

Figure 1:
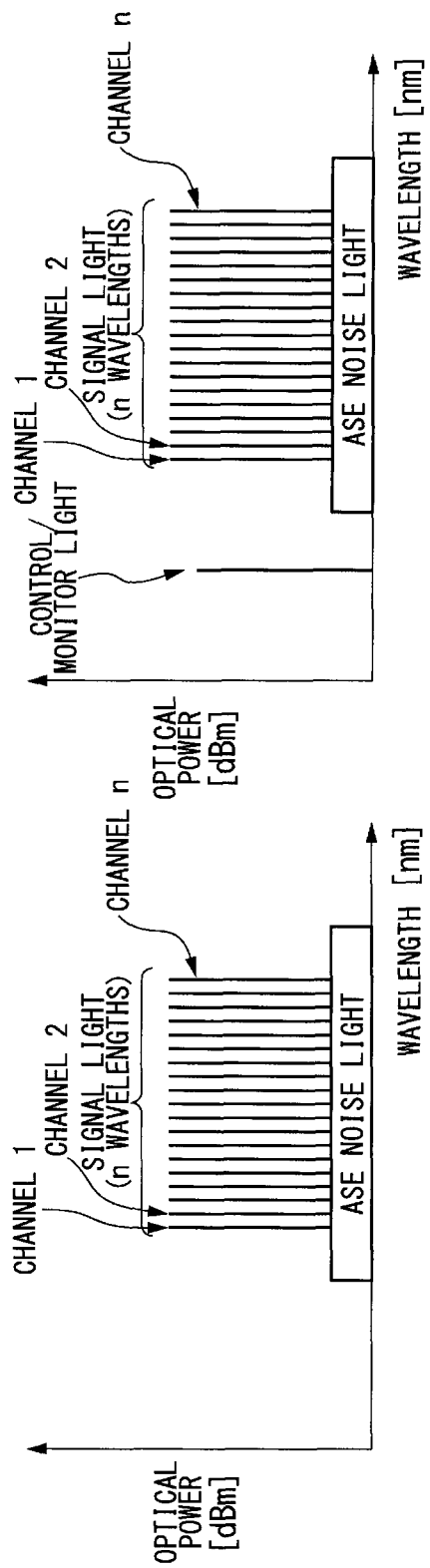
FIG. 1A is a conceptual diagram illustrating a typical example of a wavelength-multiplexed signal light spectrum when a control/monitor light does not exist.
FIG. 1B is a conceptual diagram illustrating a typical example of a wavelength-multiplexed signal light spectrum when a control/monitor light exists.

As shown in FIG. 1, the signal light is a multiplexed light of n wavelengths from channel 1 to channel n (typically n=40). The optical power of the signal light has an ASE noise light superimposed therein, which is mainly caused by the optical amplifier. The control/monitor light has a wavelength different from the normal signal light of n wavelengths from channel 1 to channel n. Various types of control information are attached to the control/monitor light, such as the number of wavelengths of the optical amplifier and the level control or the like related to the WDM transmission apparatus.

FIG. 2 is a block diagram illustrating the WDM transmission system 2000 that transmits the signal light having no control/monitor light. The WDM transmission system 2000 includes the transmission apparatus 2100 of a sending site, the transmission apparatus 2200 of a relay site and the transmission apparatus 2300 of a receiving site. The transmission apparatus 2200 of the relay site is provided for compensating the degradation of the strength level of the signal light in the event of the long transmission distance.

The transmission apparatus 2100 of the sending site has a plurality of transponders 2110: the transponder 2110(1) to the transponder 2110(n) corresponding to wavelengths to be multiplexed. The plurality of transponders 2110 wavelength-converts so-called a SDH signal and/or an Ethernet signal into a WDM signal.

The wavelength-converted signal light is multiplexed by the wavelength multiplexer 2120 and amplified by the optical amplifier 2130. A part of the signal light amplified by the optical amplifier 2130 is branched by the coupler 2140 and the WDM monitor 2150 obtains the OSNR information (it is also referred to as the optical signal noise ratio information) from the branched signal light. The monitor/control unit 2160 receives an input of the OSNR information and notifies the OSNR information via the network 2400 to the control/monitor center 2500 that monitors and controls a plurality of sites.

On the other hand, the signal light that is not branched by the coupler 2140 is transmitted to the transmission apparatus 2200 of the relay site via the fiber transmission channel 2600. The transmission apparatus 2200 of the relay site amplifies the transmitted signal light at the optical amplifier 2230 and transmits the amplified signal light to the transmission apparatus 2300 of the receiving site via the fiber transmission channel 2700.

A part of the signal light amplified by the optical amplifier 2230 is branched by the coupler 2240 and input to the WDM monitor 2250. Then the WDM monitor 2250 obtains the OSNR information from the branched signal light. The monitor/control unit 2260 receives an input of the OSNR information and notifies the OSNR information via the network 2400 to the control/monitor center 2500 that monitors and controls a plurality of sites.

The signal light transmitted to the transmission apparatus 2300 of the receiving site via the fiber transmission channel 2700 is amplified by the optical amplifier 2330 and input to the wavelength multiplexer 2320 through the coupler 2340. The signal light demultiplexed by the wavelength multiplexer 2320 is input to a transponder (not shown) for each wavelength (each channel).

The WDM monitor 2350 obtains the OSNR information from the signal light branched from the coupler 2340. The monitor/control unit 2360 notifies the OSNR information via the network 2400 to the control/monitor center 2500 that monitors and controls a plurality of sites.

FIG. 3 is a block diagram illustrating a structure of the WDM transmission system 3000 that transmits the signal light having a control/monitor light. The same reference numerals used in FIG. 3 denote the same elements of the WDM transmission system 2000 and thus a detailed explanation of such elements is omitted.

The difference between the WDM transmission system 3000 and the WDM transmission system 2000 is mainly in that the former has a function for controlling communication between the sites by using a control/monitor light but the latter does not. The control/monitor light is used for transmitting management information for monitoring the WDM system and control information for the optical amplifier or the like.

For this purpose, each transmission apparatus 2100, 2200, 2300 of the WDM transmission system 3000 is provided with the control/monitor light transmission unit 2170, 2270, 2370 for transmitting the control/monitor light between the transmission apparatuses. Each transmission apparatus 2100, 2200, 2300 of the WDM transmission system 3000 is also provided with the filter (FIL) 2180, 2280, 2290, 2390 for branching and superimposing the control/monitor light between the transmission apparatuses.

As described above, the WDM transmission systems 2000, 3000 are provided with the WDM monitors 2150, 2250, 2350 for each site, which measures the OSNR for each wavelength of the amplified signal light. The control/monitor center 2500 monitors the OSNR information of all the sites 2100, 2200, 2300 received from the monitor/control units 2160, 2260, 2360 via the network 2400.

The purpose of monitoring by the control/monitor center 2500 is to prevent the errors in the main signal while monitoring the deterioration of the OSNR. Namely, by monitoring the deterioration status of the OSNR, typically, the status of the ASE noise light, the control/monitor center 2500 not only can detect and prevent the communication failure but also can analyze the cause of the communication failure if it occurs. In other words, the OSNR can be utilized as data for checking the transmission quality of each wavelength.

Figure 7:
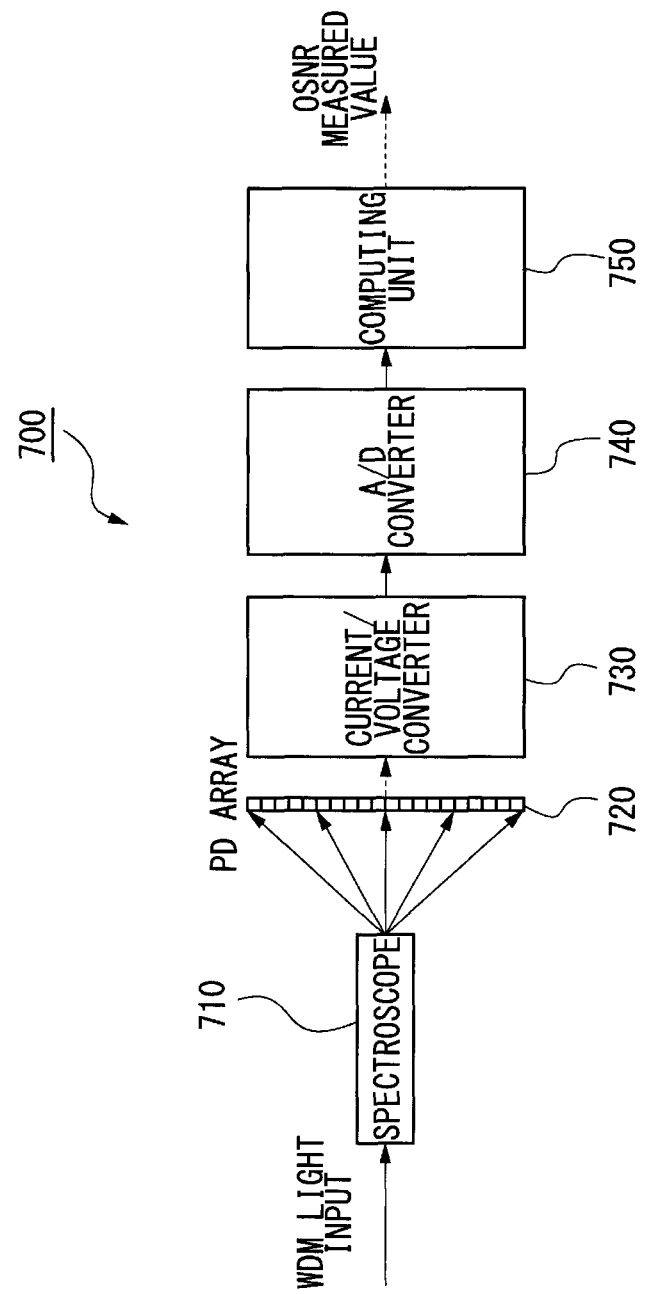
FIG. 7 is a block diagram illustrating a structure of a WDM monitor that performs an OSNR measurement for a WDM signal light.

FIG. 7 is a block diagram illustrating a typical structure of the WDM monitors 2150, 2250, 2350 that perform the OSNR measurement for the WDM signal light. The WDM monitor 700 shown in FIG. 7 emits the signal light subjected to spatial dispersion by a spectroscope 710 to a photodiode (PD) array 720 and detects the optical power for every constant wavelength interval (for each channel).

The optical power photoelectric-converted by the PD array 720 is current-voltage converted by a current/voltage converter 730 and further converted into a digital signal by an A/D converter 740 and the resultant signal is input to a computing unit 750. The computing unit 750 computes an optical power distribution (spectrum) by applying a curve approximation to digital values of the detected optical power.

The structure of the WDM monitor 700 is not limited to the above-mentioned configuration. For instance, the WDM monitor 700 may be configured by using the spectroscope 710, a wavelength-variable filter (e.g., spectrum analyzer), and a single PD. FIGS. 8A and 8B illustrate a typical example of how to compute the OSNR from the optical power distribution (spectrum) computed as described above. The signal light as shown in FIG. 8A can be measured and computed by the WDM monitor 700 as shown FIG. 8B.

As shown in FIG. 8B, the peak optical power S[dBm] for each wavelength and the noise optical power N1, N2[dBm] are computed. The noise optical power is detected at such a location that is distant by a constant wavelength from the both end of the peak wavelength, preferably, at the middle point of the wavelength grid or a location close thereto. The OSNR is computed according to the following expression (1), by using the correction coefficient C[dB] that is specific to the measurement device in order to make the noise light lower bandwidth to be 0.1 nm.

$$OSNR = S - 10 \times \log((10^{-(N1/10)} + 10^{-(N2/10)})/2) + C \quad (1)$$

Figures 9A, 9B:
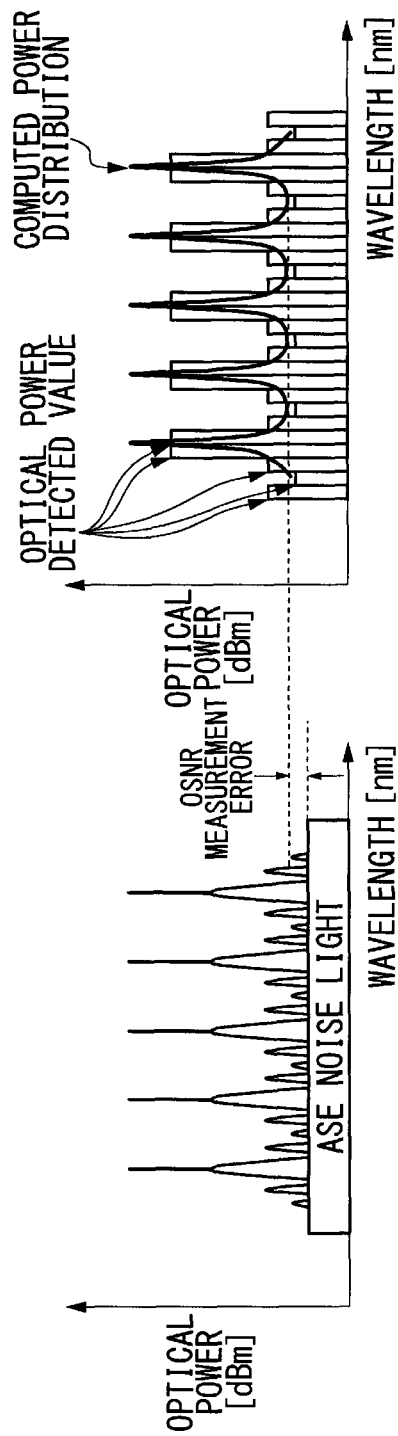
FIGS. 9A and 9B illustrate OSNR measurement error ascribed to narrow wavelength spacing.

The WDM transmission systems 2000, 3000 do not have a means for correcting the OSNR by canceling the OSNR measurement error ascribed to the narrow wavelength spacing as shown in FIGS. 9A and 9B and/or the OSNR measurement error ascribed to the high bit rate as shown in FIGS. 10A and 10B. FIGS. 9A and 9B illustrate the OSNR measurement error ascribed to the narrow wavelength spacing and FIGS. 10A and 10B illustrate the OSNR measurement error ascribed to the high bit rate.

Due to the increase in the amount of communicated information, the density of the wavelengths increases from 40 waves to 80 waves and the bit rate increases from 10 Gbps to 40 Gbps. The WDM transmission systems need to cope with the high density and high bit rate of the signal light. It is noted that when the bit rate rises from 10 Gbps to 40 Gbps, the modulation frequency becomes high.

[First Embodiment]

Figure 4:
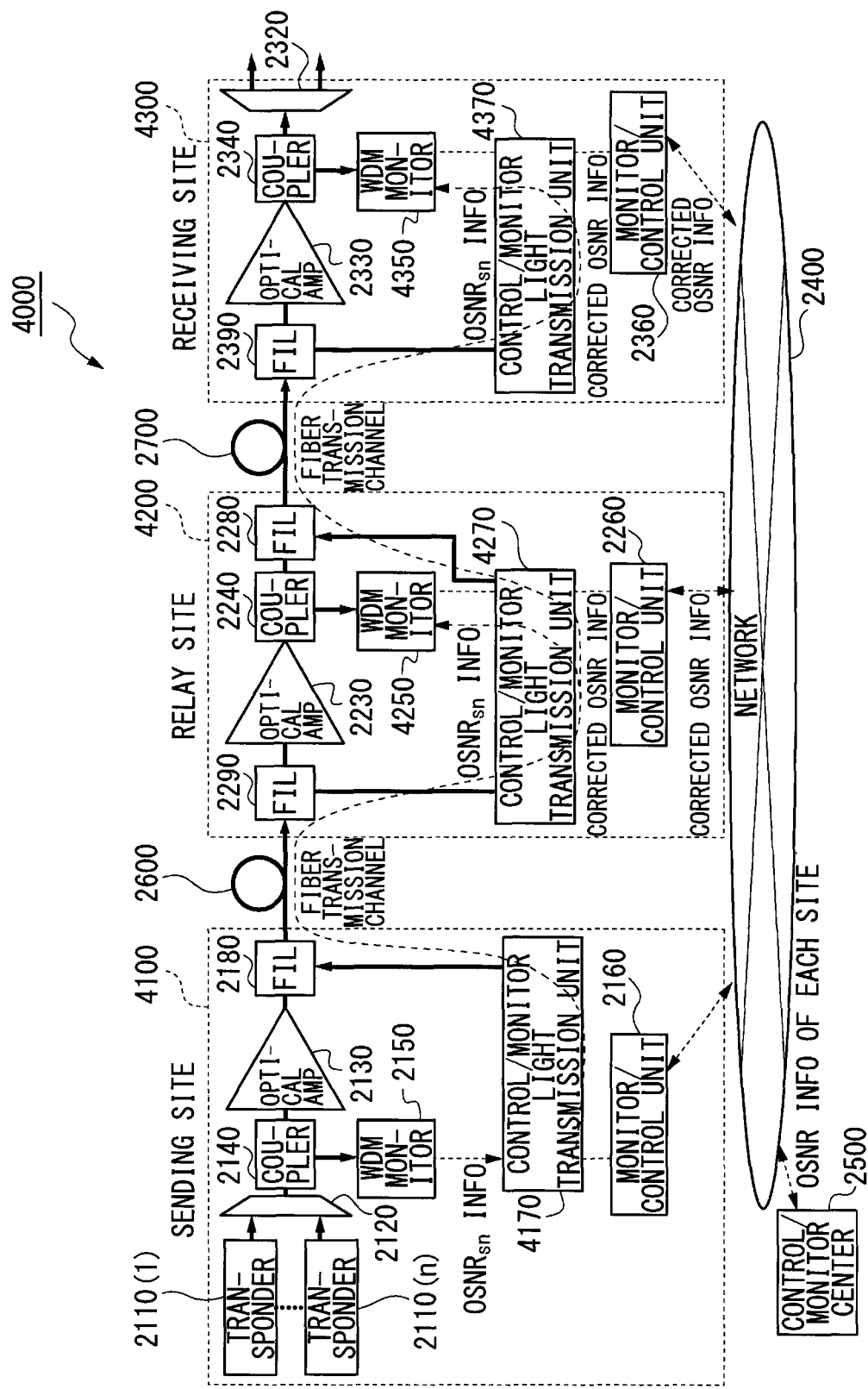
FIG. 4 is a block diagram illustrating a structure of a WDM transmission system according to an embodiment of the present invention.
Figure 5:
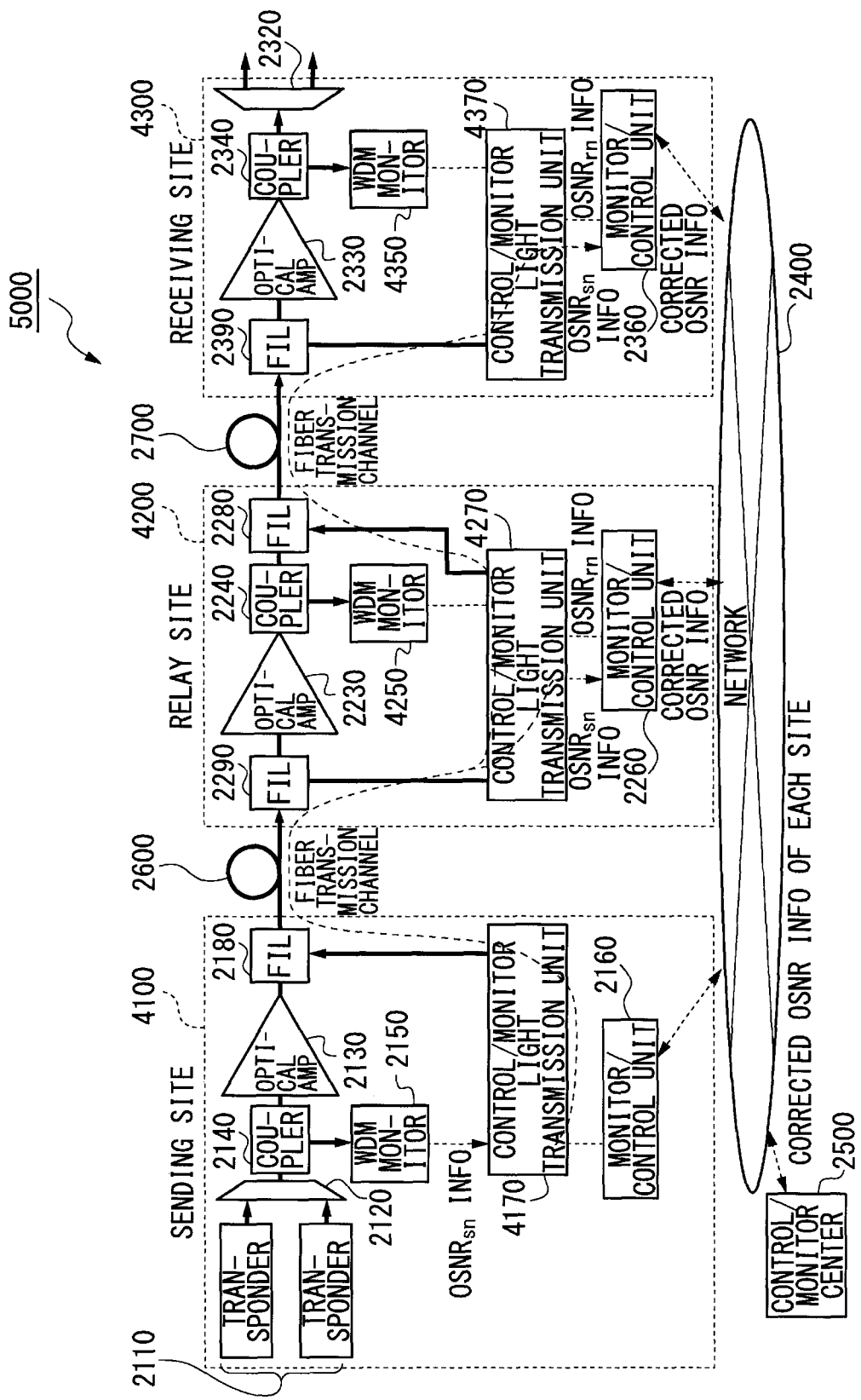
FIG. 5 is a block diagram illustrating a structure of a WDM transmission system according to another embodiment of the present invention.
Figure 6:
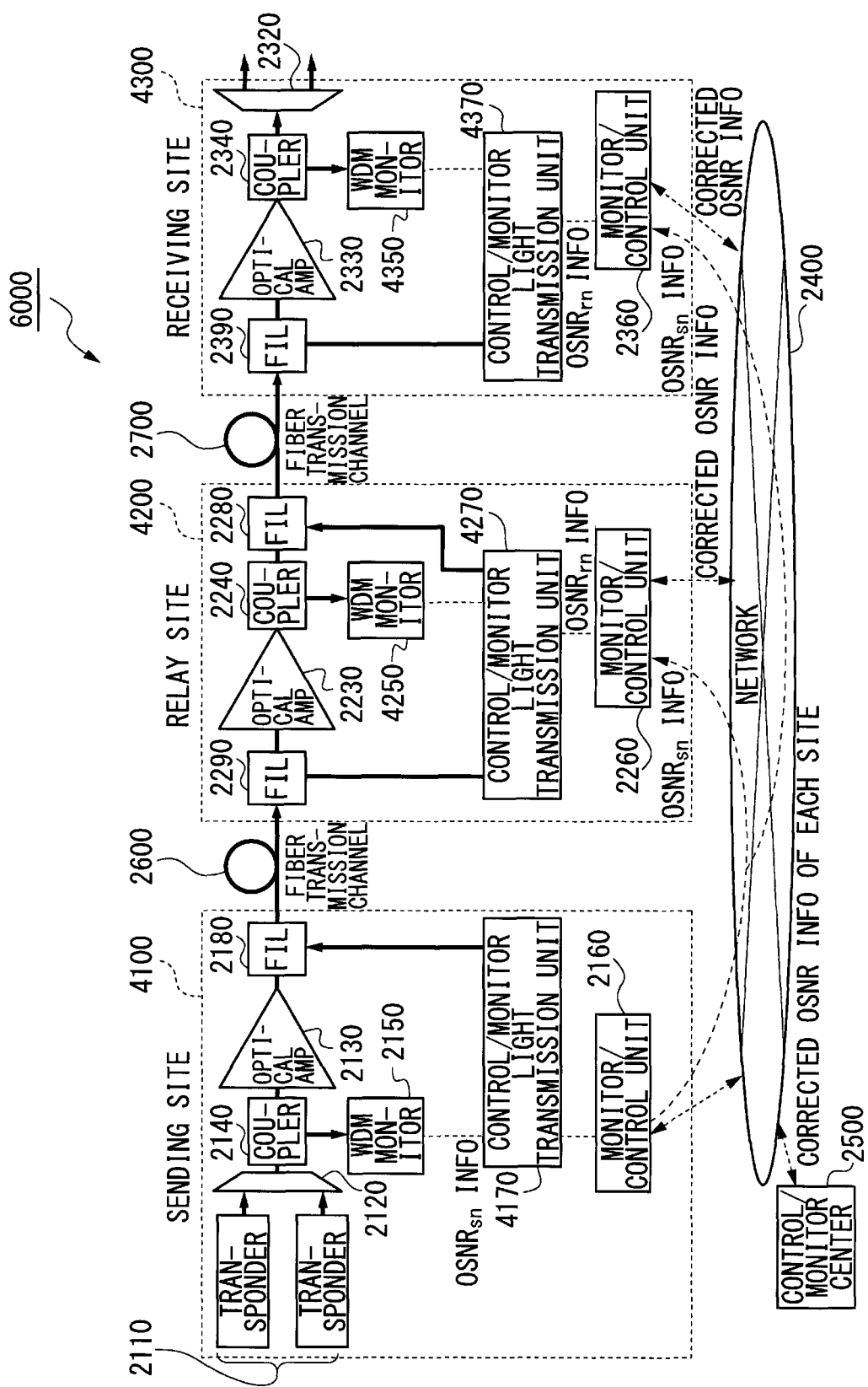
FIG. 6 is a block diagram illustrating a structure of a WDM transmission system according to yet another embodiment of the present invention.

FIG. 4 to FIG. 6 are block diagrams illustrating the structure of WDM transmission systems according to some embodiments of the present invention. The same reference numerals used in FIG. 4 to FIG. 6 denote the same elements in FIG. 2 and FIG. 3 and thus a detailed explanation of such elements is omitted. In the WDM transmission systems shown in FIG. 4 to FIG. 6, a wavelength multiplexer (also referred to as a mux/demux) at a sender site wavelength-multiplexes each signal light from transponders, and a coupler (also referred to as an optical branching unit), which is arranged in front of an optical fiber, branches the wavelength-multiplexed optical signal to give the branched signal to a WDM monitor.

In the WDM transmission system 4000 in FIG. 4, the transmission apparatus 4100 at the sender site obtains OSNRsn information from the signal light branched by the coupler 2140 in front of the optical amplifier 2130. Hereinafter, the lowercase character "s" indicates a sender and the lowercase character "n" indicates the number of channels (wavelengths). More specifically, the WDM monitor 2150 obtains the OSNRsn information from the signal light branched by the coupler 2140. The control/monitor transmission unit 4170 adds the OSNRsn information obtained by the WDM monitor 2150 to a control/monitor light. The FIL 2180 further adds the control/monitor light having the OSNRsn information to the signal light and then transmit the resultant signal light.

The OSNRsn measured by the WDM monitor 2150 is the OSNR information of OSNRs1 to OSNRs40, if the number of the wavelength multiplexing is 40. The measurement unit of OSNRsn value is dB. The letter "n" indicates the channel number: wavelength 1 to wavelength n. The OSNRsn information measured by the WDM monitor 2150 does not include the ASE noise light component of the optical amplifier, as shown in FIGS. 11A and 11B. Therefore, the measured value corresponds to the OSNR information in which the sideband component of the transmission signal is digitalized. FIGS. 11A and 11B illustrate the OSNRsn information detected by the transmission apparatus 4100 at the sending site.

In the transmission apparatus 4200 at a relay site, the control/monitor light transmission unit 4270 receives the OSNRrn information and further transmits it to the downstream transmission apparatus 4300 of a receiving site. In addition, the transmission apparatus 4200 at the relay site notifies the OSNRrn information to its own WDM monitor 4250.

The WDM monitor 4250 computes a corrected OSNR, in which the effect of the sideband is reduced or eliminated, based on both the notified OSNRsn information and the OSNRrn information measured from the signal light branched by the coupler 2240. Hereinafter, the lowercase character "r" indicates a receiver. The computed corrected OSNR mainly reflects the effect by the ASE noise signal of the optical amplifier 2130. By using the corrected OSNR, the WDM monitor 4250 can obtain an accurate noise component. The monitor/control unit 2260 notifies the corrected OSNR to the control/monitor center 2500 via the network 2400.

The transmission apparatus 4300 of the receiving site only notifies the OSNRsn information received in the control/monitor light transmission unit 4370 to its own WDM monitor 4350 but does not forward the information downstream. Therefore, the downstream transfer process is not required.

The WDM monitor 4350 computes a corrected OSNR, in which the effect of the sideband is reduced or eliminated, based on both the notified OSNRsn information and the OSNRrn information measured from the signal light branched by the coupler 2340. The computed corrected OSNR mainly reflects the effect by the ASE noise signal of both the optical amplifier 2130 and the optical amplifier 2230. By using the corrected OSNR, the WDM monitor 4350 can obtain an accurate noise component. The monitor/control unit 2360 notifies the corrected OSNR to the control/monitor center 2500 via the network 2400.

In the transmission apparatus 4200 of the relay site and the transmission apparatus 4300 of the receiving site, the couplers 2240, 2340 are provided at the output terminal of the optical amplifiers 2230, 2330 respectively and the WDM monitors 4250, 4350 are assigned to the branch destination of the couplers 2240, 2340 respectively. The WDM monitor 4250, 4350 may measure OSNR according to any well-known methods and the measured value is OSNRrn, where the measurement unit is dB and "n" indicates the channel number: wavelength 1 to wavelength n. In this case, the couplers (optical branching units) 2240, 2340 may be provided in front of the optical amplifiers 2230, 2330; however there is concern that the OSNR characteristics could deteriorate to a certain degree.

Figures 12A, 12B:
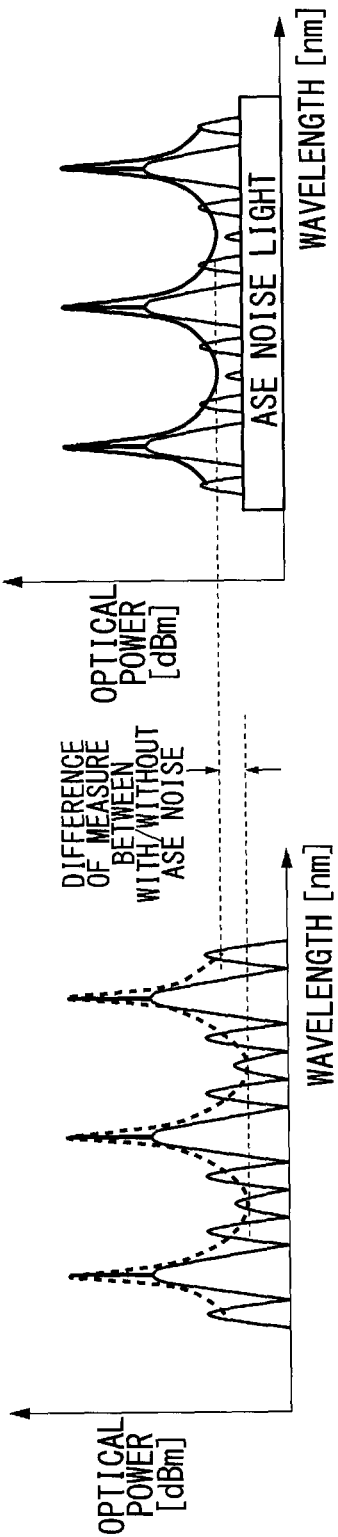
FIGS. 12A and 12B illustrate how the difference between the OSNRsn information and the OSNRm information is detected.

As described above, there is a difference, as shown in FIGS. 12A and 12B, between the OSNRsn information and the OSNRrn information, the former is received by the WDM monitors 4250, 4350 of the transmission apparatus 4200 of the relay site and the transmission apparatus 4300 of the receiving site and the latter is measured by the same. The difference is the ASE noise component. FIGS. 12A and 12B illustrate how the difference between the OSNRsn information and the OSNRrn information is detected.

Hence, the WDM monitors 4250, 4350 can compute a relatively accurate corrected OSNRn in which the modulated sideband component of each channel has been eliminated according to the following expression (2), wherein the measurement unit is dB and "n" is the channel number (1 to the number of wavelengths).

$$OSNRn = -10 \times \log(10^{(-OSNRrn/10)} - 10^{(-OSNRsn/10)}) \quad (2)$$

WHERE n IS THE CHANNEL NUMBER.

Figure 13:
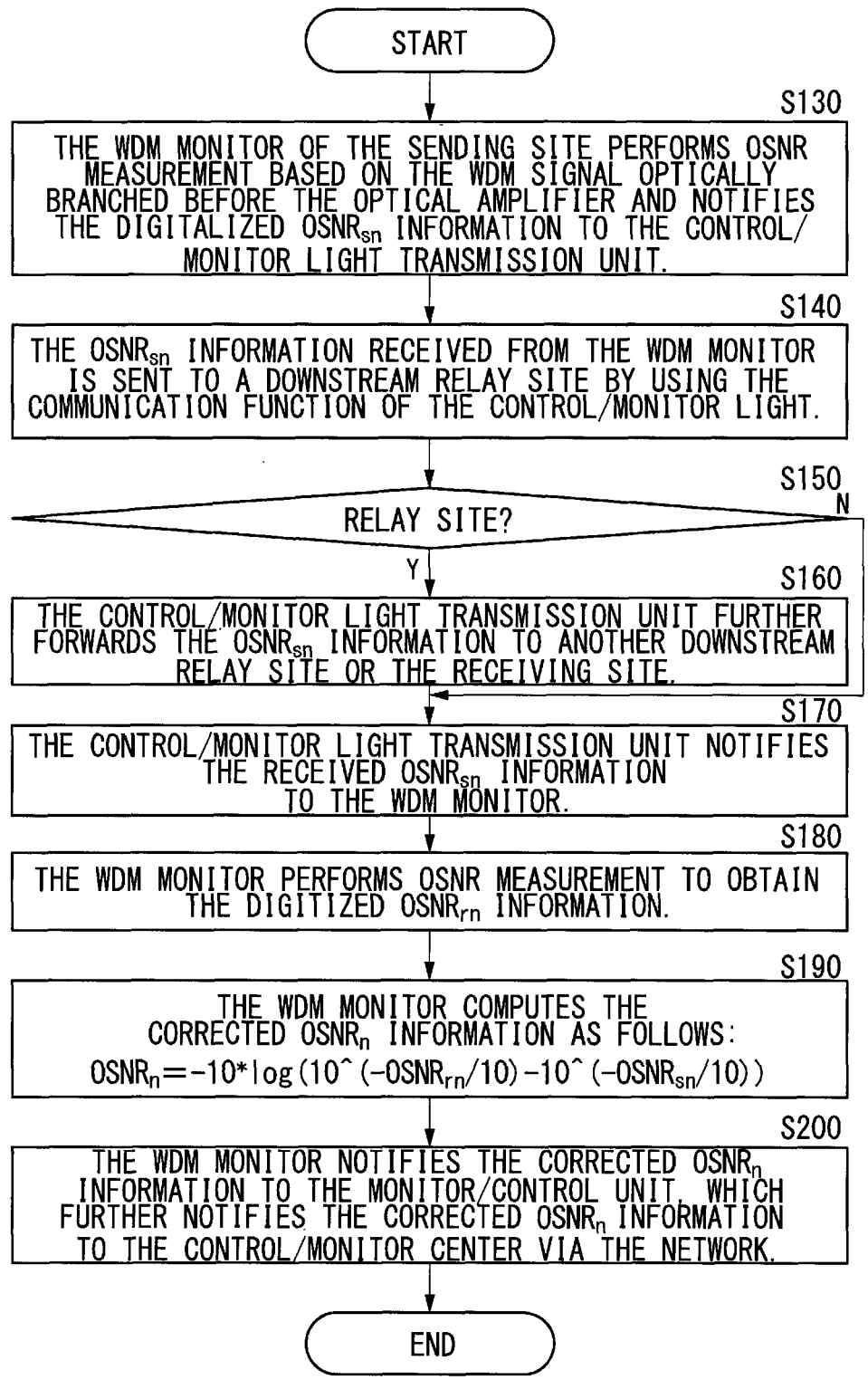
FIG. 13 is a flow diagram illustrating a process for computing corrected OSNRn information in a WDM transmission system.

The monitor/control unit 2260 notifies the corrected OSNRn information computed for each channel according to the above-mentioned expression (2) to the control/monitor center 2500 via the network 2400. With reference to FIG. 13, a flow of the computation of the corrected OSNRn information executed by the WDM transmission system 4000 is explained. FIG. 13 is a flow diagram illustrating the process for computing the corrected OSNRn information in the WDM transmission system 4000.

(Step S130)

In the transmission apparatus 4100 of the sending site, the WDM monitor 2150 performs OSNRsn measurement based on the WDM signal optically branched by the coupler 2140 in front of the optical amplifier 2130 and obtains the digitalized OSNRsn information. The WDM monitor 2150 then notifies the digitalized OSNRsn information to the control/monitor light transmission unit 4170.

(Step S140)

The control/monitor light transmission unit 4170 sends the OSNRsn information notified from the WDM monitor 2150 to the downstream transmission apparatus 4200 of the relay site by a communication function using the control/monitor light.

It is preferable that the WDM monitor 2150 should coordinate the notification of the OSNRsn information with the OSNR measurement cycle (for instance several tens of milliseconds to hundreds of milliseconds) and should continuously notify the updated OSNRsn information at all times. Thereby, the WDM transmission system 4000 can monitor the up-to-date transmission quality.

(Step S150)

If the destination of the notified OSNRsn information is the transmission apparatus 4200 of the relay site, Step S160 is performed, but if not, Step S170 is performed instead.

(Step S160)

The transmission apparatus 4200 of the relay site transfers the notified OSNRsn information to the downstream receiving site without modification. If there is another relay site downstream, the transmission apparatus 4200 of the relay site transfers it to the downstream relay site. More specifically, the control/monitor light transmission unit 4270 transfers the notified OSNRsn information downstream.

(Step S170)

The control/monitor light transmission unit 4270 notifies the notified OSNRsn information to the WDM monitor 4250. It is noted that Step 160 and Step S170 could be executed in any order and the control/monitor light transmission unit 4270 might perform Step 160 and Step 170 simultaneously.

(Step S180)

The WDM monitor 4250 performs OSNR measurement based on the signal light branched by the coupler 2240 to obtain the digitized OSNRrn information.

(Step S190)

Figure 14:
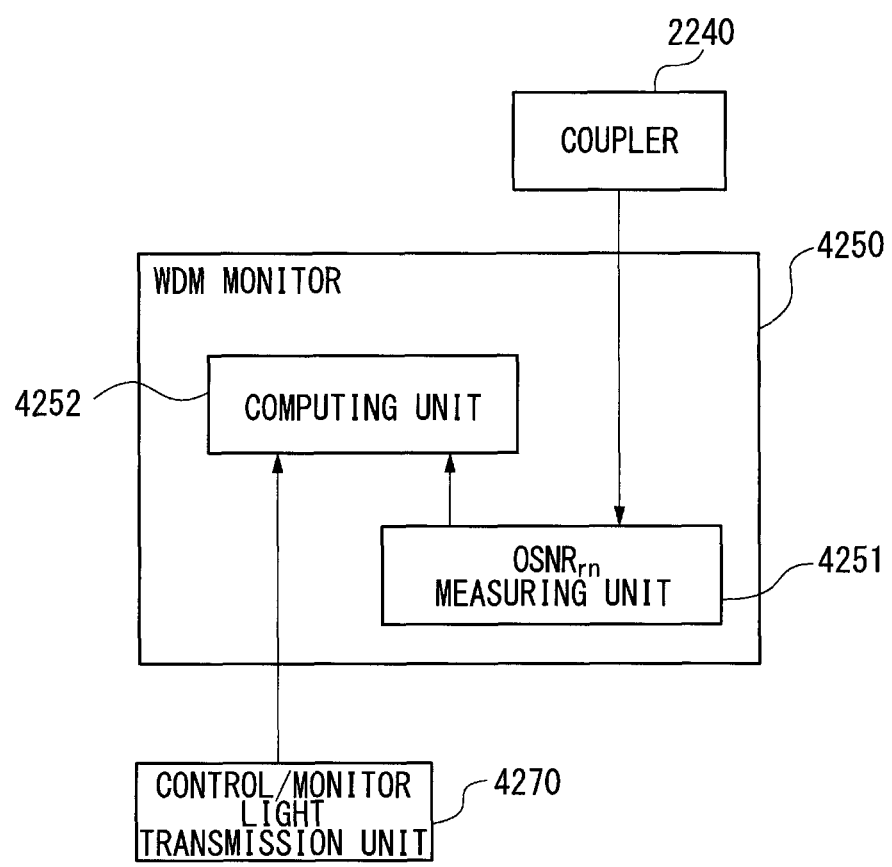
FIG. 14 is a block diagram illustrating a typical structural example of a WDM monitor.

The WDM monitor 4250 computes the corrected OSNRn information by performing the calculation of the above-mentioned expression (2). The WDM monitor 4250 may be configured, for instance, as a structure explained in FIG. 14. FIG. 14 is a block diagram illustrating a typical structural example of the WDM monitor 4250.

More specifically, the computing unit 4252 performs the calculation process of the above-mentioned expression (2) using both the OSNRrn information, which the OSNRrn measuring unit 4251 has obtained and digitalized through the OSNR measurement based on the signal light branched from the coupler 2240, and the OSNRsn information provided from the control/monitor light transmission unit 4270, so as to obtain the corrected OSNRn information.

(Step S200)

The WDM monitor 4250 notifies the computed corrected OSNRn information to the monitor/control unit 2260. The monitor/control unit 2260 notifies the computed corrected OSNRn information to the control/monitor center 2500 via the network 2400.

[Second Embodiment]

The WDM transmission systems 4000 and 5000 shown in FIG. 4 and FIG. 5 respectively are of a typical structure for notifying the OSNRsn information to the downstream transmission apparatus 4200, 4300 of the relay site or the receiving site by using the control/monitor light. On the other hand, the WDM transmission system 6000 of FIG. 6 is of a typical structure for notifying the OSNRsn information to the downstream relay site or receiving site via the monitor/control units 2260, 2360 and the network 240.

The WDM transmission system 5000 of FIG. 5 differs from the WDM transmission system 4000 in that the OSNRsn information received via the control/monitor light transmission units 4170 and 4270 is notified to the monitor/control unit 2260 and the process for computing the corrected OSNRn is performed in the monitor/control unit 2260.

In the WDM transmission system 5000, the WDM monitor 4250 is not notified of the OSNRsn information and the WDM monitor 4250 does not compute the corrected OSNRn according to the above-mentioned expression (2). It is noted that the structure and process of the WDM transmission system 5000 is the same as those of the WDM transmission system 4000 in that the control/monitor light transmission unit 4270 of the transmission apparatus 4200 of the relay site transfers the OSNRsn information, and thus a detailed explanation thereof is omitted.

The WDM transmission system 6000 of FIG. 6 differs from the WDM transmission systems 4000 and 5000 in that the monitor/control units 2260 and 2360 in the transmission apparatuses 4200 and 4300 of both the relay site and the receiving site receive the OSNRsn information via the network 2400. The WDM transmission system 6000 is the same as the WDM transmission system 5000 in that the monitor/control units 2260 and 2360 computes the corrected OSNRn according to the above-mentioned expression (2).

In the WDM transmission system 6000, the control/monitor light transmission unit 4170 does not embed the OSNRsn information notified from the WDM monitor 2150 into the control/monitor light, but notifies it to the monitor/control unit 2160 instead. The monitor/control unit 2160 further notifies the notified OSNRsn information to the transmission apparatus 4200 of the relay site and the transmission apparatus 4300 of the receiving site via the network 2400. Thus, the WDM transmission system 6000 is preferably applicable to a transmission system where communication is performed by a signal light with no control/monitor light.

On the other hand, according to the WDM transmission system 4000, since the transmitted signal light with the addition of the OSNRsn information is transmitted via the same fiber transmission channel, the failure of the signal light and the notification failure of the OSNRsn information could be synchronized. Therefore, it can preferably prevent such a situation that the OSNRsn information is not notified, despite the fact that the signal light is properly transmitted.

[Third Embodiment]

Figure 15:
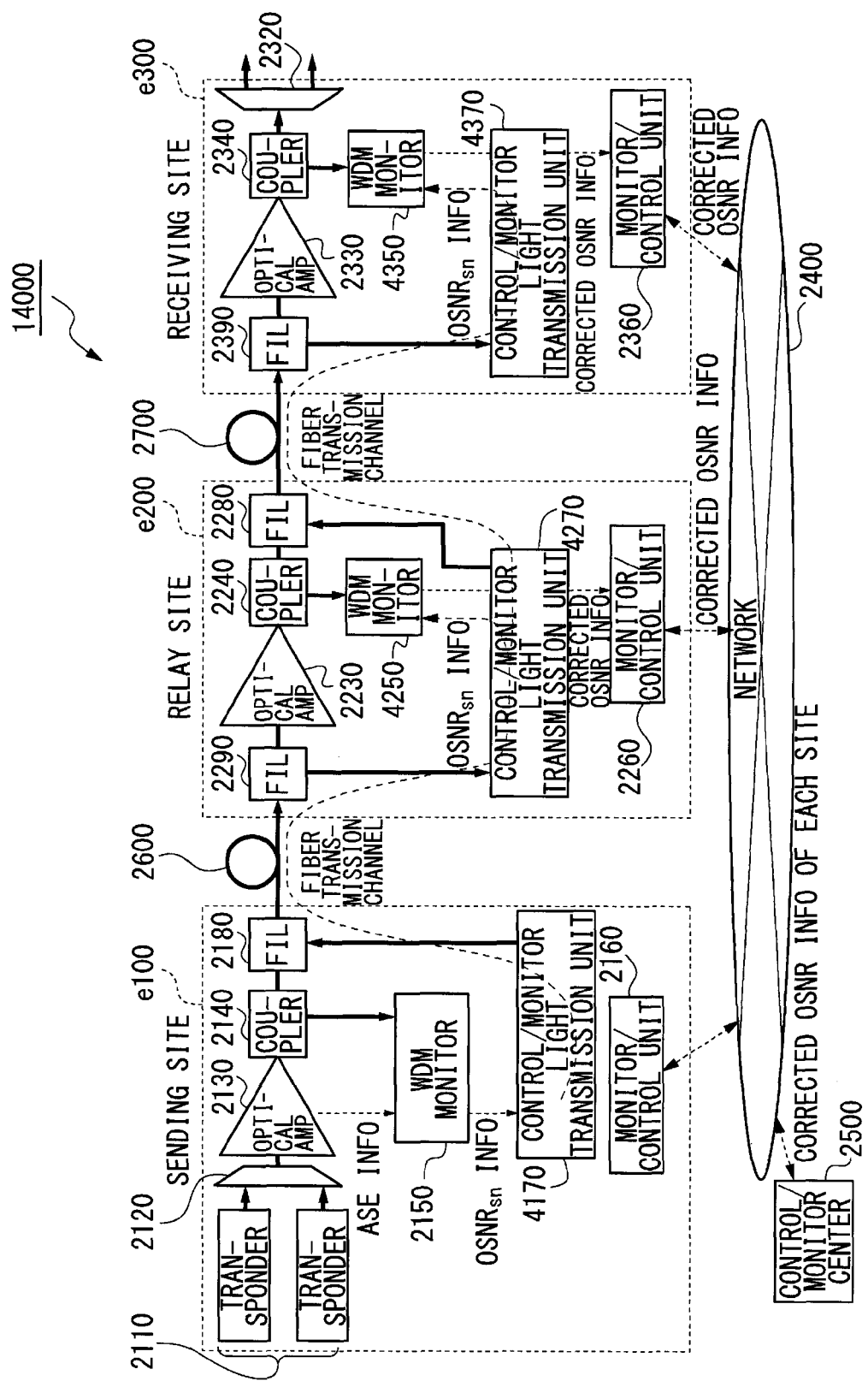
FIG. 15 is a block diagram illustrating a WDM transmission system where a light branched from at an output terminal of an optical amplifier is input to a WDM monitor.

FIG. 15 is a block diagram illustrating the WDM transmission system 14000 where the light is branched from the coupler 2140 attached to the output terminal of the optical amplifier 2130 in the transmission apparatus e100 of the sending site and the branched light is input to the WDM monitor 2150. The WDM transmission system 14000 is preferable in that the common arrangement and structure of the optical amplifiers 2230, 2330 and the couplers 2240, 2340 in the transmission apparatuses e200, e300 of the relay site and the receiving site can be adopted.

In the WDM transmission system 14000 shown in FIG. 15, the OSNRs'n measured by the WDM monitor 2150 contains the ASE component of the optical amplifier 2130 that corresponds to a sending amplifier. The measurement unit is dB and "n" indicates the channel number (1 to the number of the wavelengths).

Therefore, the value of OSNR"n that corresponds to the ASE component of the optical amplifier 2130 is subtracted from the value of OSNRs'n measured by the WDM monitor 2150 so as to compute the sideband component OSNRsn of the main signal as follows.

$$Bn = 10^{\wedge}(-OSNRs'n/10) - 10^{\wedge}(-OSNRs''n/10) \brace OSNRsn = -10 \times \log(Bn)$$ (3)

WHERE n IS THE CHANNEL NUMBER.

The value of OSNRs"n is calculated from OSNRs"n_min information and OSNRs"n_max information, which has been measured beforehand and stored in the optical amplifier 2130 at the time of manufacturing the optical amplifier 2130.

Figure 16:
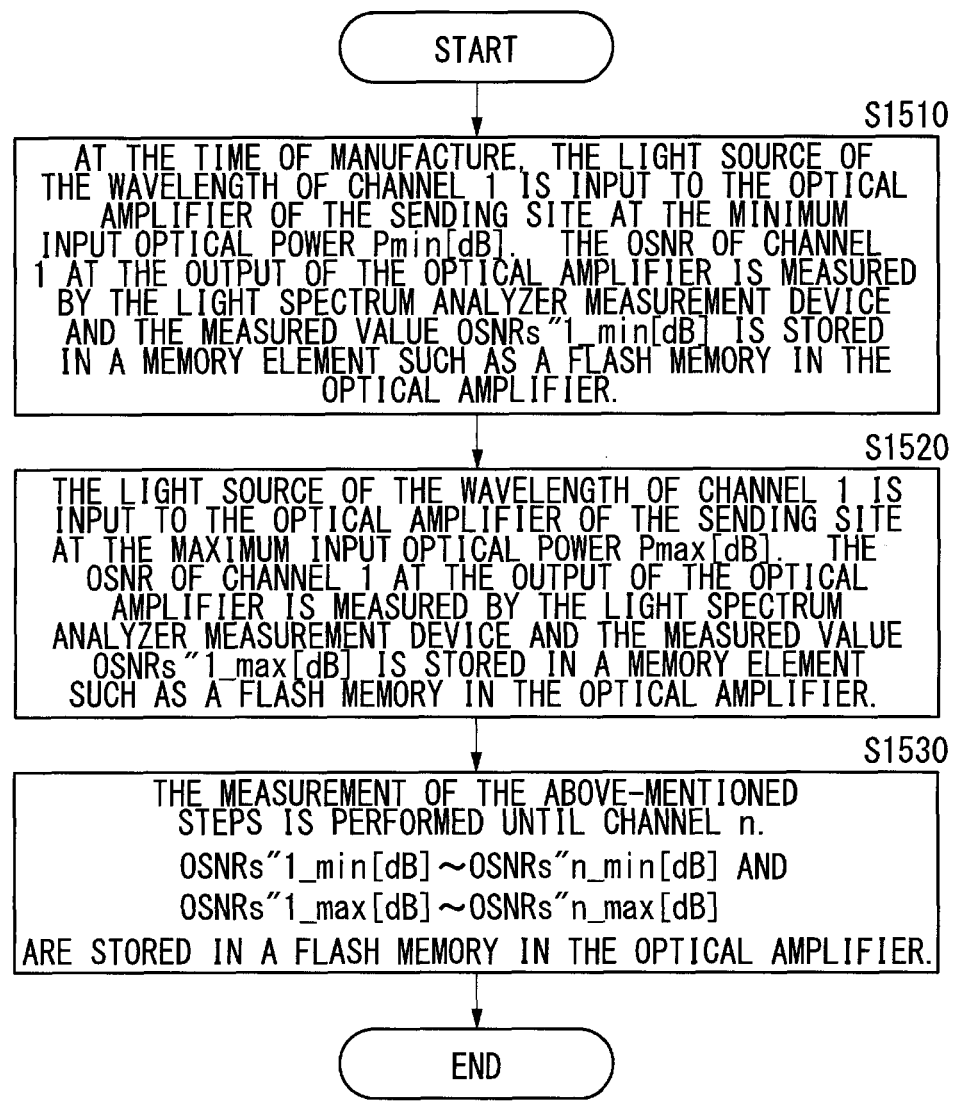
FIG. 16 is a flowchart illustrating a measurement process and a storing process of OSNRs"n_min and OSNRs"n_max information.

The OSNRs"n_min and OSNRs"n_max information are stored in the optical amplifier 2130 according to the flow described in FIG. 16. For this purpose, the optical amplifier 2130 may have a memory for storing the OSNRs"n_min and OSNRs"n_max information. FIG. 16 is a flowchart illustrating the measurement process and the storing process of the OSNRs"n_min and OSNRs"n_max information.

(Step S1510)

At the time of manufacture, the light source of the wavelength of the channel 1 is input to the optical amplifier 2130 in the transmission apparatus e100 of the sending site at the minimum input optical power Pmin[dB]. The OSNR of channel 1 at the output of the optical amplifier 2130 is measured by using the light spectrum analyzer measurement device.

Then the value measured by the light spectrum analyzer measurement device is stored as OSNRs"1_min[dB] information in a storage unit such as a flash memory provided in the optical amplifier 2130.

(Step S1520)

The light source of the wavelength of the channel 1 is input to the optical amplifier 2130 in the transmission apparatus e100 of the sending site at the maximum input optical power Pmax[dB]. The OSNR of channel 1 at the output of the optical amplifier 2130 is measured by the light spectrum analyzer measurement device.

Then the value measured by the light spectrum analyzer measurement device is stored as the OSNRs"1_max[dB] information in a storage unit such as a flash memory provided in the optical amplifier 2130.

(Step S1530)

The measurement of the above-mentioned steps S1510 and S1520 is repeatedly performed for each channel from the channel 2 to n. Thus, OSNRs"1_min[dB] to OSNRs"n_min [dB] and OSNRs"1_min[dB] to OSNRs"n_min[dB] are stored in a storage unit in the optical amplifier 2130.

Figure 17:
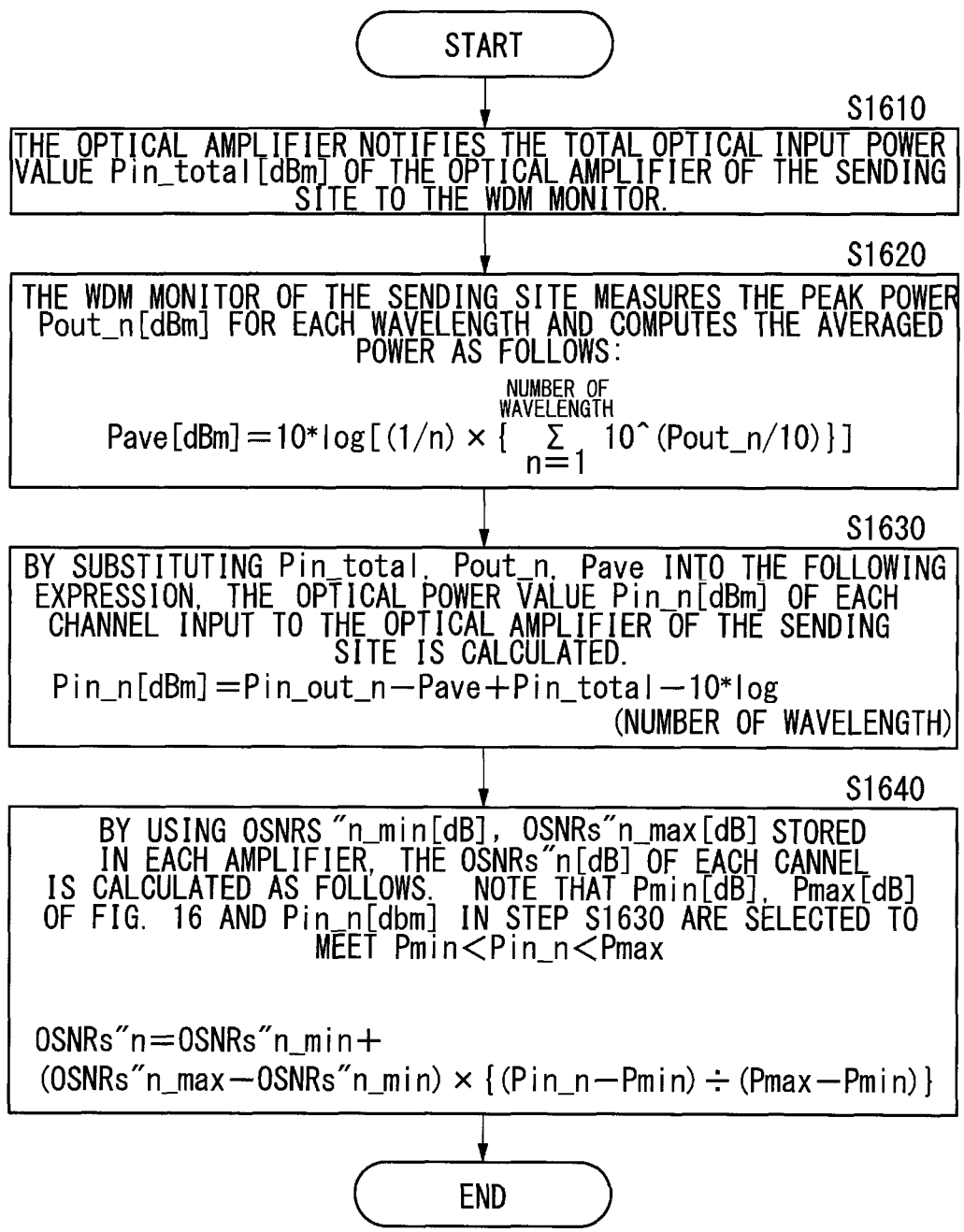
FIG. 17 is a flowchart showing an example of how to compute OSNRs"n.

The optical amplifier 2130 notifies the OSNRs"n_min and OSNRs"n_max stored beforehand to the WDM monitor 2150. Upon receiving the notification from the optical amplifier 2130, the WDM monitor 2150 can compute the OSNRs"n according to the flow described in FIG. 17. FIG. 17 is a flowchart showing an example of how to compute the OSNRs"n.

In the WDM transmission system 14000, the optical input level is normally within the range of plus or minus 3 dB. For this reason, it is possible to precisely compute the value of the OSNRs"n by using a linear approximation described in the process flow explained with reference to FIG. 17. Alternatively, the computation is performed by using a polynomial approximation based on the measured OSNR of a plurality of input levels.

(Step S1610)

The optical amplifier 2130 notifies the total optical input power value Pin_total[dBm] of the optical amplifier 2130 in the transmission apparatus e100 of the sending site to the WDM monitor 2150.

(Step S1620)

The WDM monitor 2150 in the transmission apparatus e100 of the sending site measures the peak power Pout_n [dBm] for each wavelength and computes the averaged optical power Pave according to the following expression (4).

$$\text{Pave } (dBm) = 10 \times \log\left((1/n) \times \left(\sum_{n=1}^{\substack{\text{NUMBER OF} \\ \text{WAVELENGTH}}} 10^{\wedge}(\text{Pout\_n}/10)\right)\right)$$ (4)

(Step S1630)

By substituting the total optical input power Pin_total [dBm], the peak power Pout_n[dBm] of each wavelength, and the average optical power Pave into the following expression (5), the optical power value Pin_n[dBm] of each channel input to the optical amplifier 2130 in the transmission apparatus e100 is calculated.

$$Pin\_n \text{ (dBm)}=Pin\_out\_n-Pave+Pin\_total-10\times\log^{(NUMBER\ OF\ WAVELENGTH)}$$ (5)

(Step S1640)

By using OSNRs"n_min[dB] and OSNR"n_max[dB] stored beforehand in the optical amplifier 2130, the WDM transmission system 14000 calculates the OSNRs"n[dB] of each cannel as follows.

$$OSNRs"n=OSNRs"n\_\min+(OSNRs"n\_\max-OSNRs"n\_\min)\times((Pin\_n-Pmin)/(Pmax-Pmin))$$ (6)

It is noted that the Pmin[dB], Pmax[dB] of FIG. 16 and Pin_n[dBm] in Step S1630 are selected to meet Pmin<Pin_n<Pmax.

Figure 18:
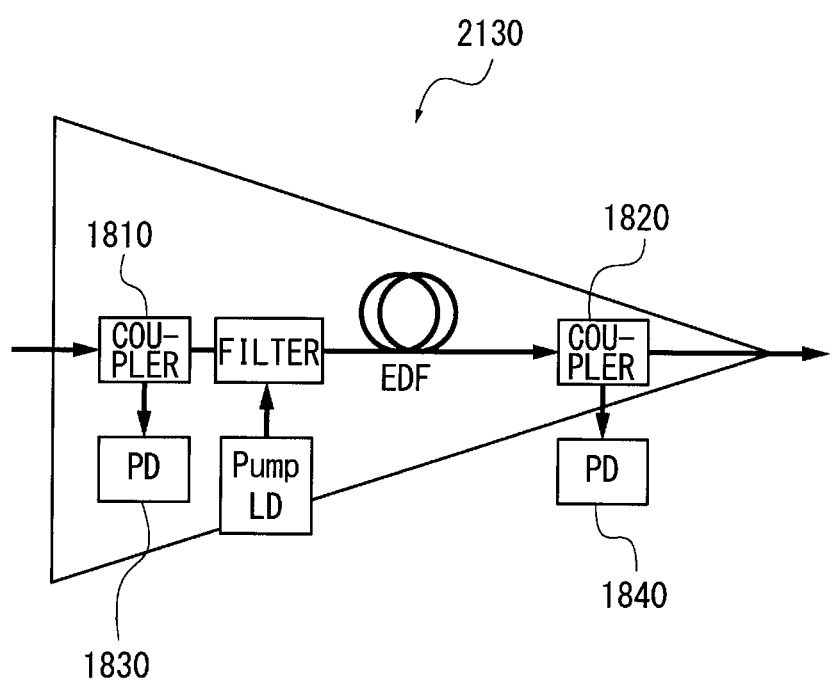
FIG. 18 is a block diagram illustrating a structure of an input/output optical power monitor of an optical amplifier.

As shown in FIG. 18, the optical amplifier 2130 generally includes an input-terminal optical coupler 1810 arranged at the input terminal and an output-terminal optical coupler 1820 arranged at the output terminal. Furthermore, the optical amplifier 2130 includes photo diodes (PD) 1830, 1840 arranged at the branch terminal of the input-terminal optical coupler 1810 and the output-terminal optical coupler 1820 so that the amplifier has a function for photoelectric-converting the total optical power including the wavelength-multiplexed optical signal and the ASE noise into the electrical signal and monitoring the signal. FIG. 18 is a block diagram illustrating a structure of the input/output optical power monitor of the optical amplifier 2130.

By using the function for monitoring the total optical power, the optical amplifier 2130 measures the Pin_total in the process flow explained with reference to FIG. 17. Furthermore, the WDM transmission system 14000 determines how the input power to the optical amplifier 2130 varies channel by channel by alternatively evaluating the output power of the optical amplifier for each channel.

For this reason, the value of the OSNRs"n of each channel will have a slight error. Therefore, the WDM transmission systems 4000, 5000 and 6000 explained with reference to FIG. 4, FIG. 5 and FIG. 6 are preferable in that they can measure the OSNRs"n more precisely than the WDM transmission system 14000.

Alternatively, although it is not explained above, the calculation of the OSNRs"n may be performed in the monitor/control unit 2160, but such calculation is not restricted only to the monitor/control unit 2160. The calculation may be performed in any other units of the WDM transmission system 14000.

The structure of the WDM transmission system 14000 where the transmission apparatus e200 of the relay site and/or the transmission apparatus e300 of the receiving site compute the corrected OSNRn from the OSNRsn calculated as described above is the same as that of the WDM transmission systems 4000, 5000, 6000 with reference to FIG. 4 to FIG. 6.

The method in which the transmission apparatus e200 of the relay site and/or the transmission apparatus e300 of the receiving site in the WDM transmission system 14000 compute the corrected OSNRn from the OSNRsn is realized as a method similar to the process flow explained with reference to FIG. 13. To avoid repetition in a description of the structure of the WDM transmission system 14000, the same reference numerals denote the elements corresponding to the WDM transmission system 6000 or the like and thus a detailed explanation of such elements is omitted.

The WDM transmission systems illustrated in the embodiments can measure the OSNR of each wavelength relatively precisely even when the transmission wavelength becomes narrower and the bit rate of the transmission wavelength becomes higher. Furthermore, even when the ASE noise light and the sideband are not distinguishable on the display monitor, more accurate noise component can be detected by using the above-mentioned structure and process.

The WDM transmission system and the WDM transmission apparatus according to the present invention are not restricted only to the description of the embodiments. It is understood by those skilled in the art that various modifications to the combination of each component and process thereof are possible and that such modifications are also within the scope of the present invention.

What is claimed is:

1. A wavelength division multiplexing (WDM) transmission system for transmitting a wavelength division multiplexed signal light from a sender transmission apparatus to a receiver transmission apparatus, the system comprising:
a first computing unit that subtracts from an originally-measured optical signal to noise ratio (OSNR) of the signal light, which is measured by the receiver transmission apparatus, an additional OSNR ascribed to a harmonic signal sideband of the signal light measured by the sender transmission apparatus so as to compute a corrected OSNR of an amplified spontaneous emission (ASE) noise light with a reduction of an effect of the signal sideband which is considered as noise in the originally-measured OSNR of the signal light.

2. The WDM transmission system of claim 1, wherein the sender transmission apparatus comprises:
a wavelength multiplexer that wavelength-multiplexes the signal light; and
an optical amplifier that amplifies the signal light wavelength-multiplexed by the wavelength-multiplexer, wherein
the sender transmission apparatus measures the additional OSNR from the signal light sampled between the wavelength multiplexer and the optical amplifier and reports the measured additional OSNR to the receiver transmission apparatus.

3. The WDM transmission system of claim 2, wherein the receiver transmission apparatus comprises a WDM monitor that measures the originally-measured OSNR of the signal light, and wherein the WDM monitor subtracts from the originally-measured OSNR the additional OSNR reported by the sender transmission apparatus.

4. The WDM transmission system of claim 1, wherein the sender transmission apparatus transmits the additional OSNR to the receiver transmission apparatus via a transmission channel for transmitting the signal light.

5. The WDM transmission system of claim 1, wherein the receiver transmission apparatus comprises:
a WDM monitor that measures the originally-measured OSNR of the signal light; and
a monitor/control unit that is connected to a communication network, and wherein
the monitor/control unit subtracts the additional OSNR, which is reported by the sender transmission apparatus, from the originally-measured OSNR provided by the WDM monitor.

6. The WDM transmission system of claim 5, wherein the sender transmission apparatus reports the additional OSNR to the receiver transmission apparatus via the communication network.

7. The WDM transmission system of claim 1, wherein the sender transmission apparatus comprises:
a measuring unit, which receives from an optical amplifier an output signal light containing an ASE component and which measures an initial OSNR of the output signal light ; and
a second computing unit, which obtains an ASE OSNR corresponding to only the ASE component of the output signal light and which subtracts the ASE OSNR from the initial OSNR of the output signal light so as to compute the additional OSNR.

8. The WDM transmission system of claim 7, wherein the sender transmission apparatus further comprises:
a WDM monitor, which measures the initial OSNR of the output signal light that is sampled from an output terminal of the optical amplifier; and
a storage unit, which stores the obtained ASE OSNR.

9. The WDM transmission system of claim 8, wherein the ASE OSNR is measured beforehand and stored in the storage unit at the time of manufacturing the optical amplifier.

10. The WDM transmission system of claim 8, wherein the storage unit stores a minimum ASE OSNR component (OSNRmin) and a maximum ASE OSNR component (OSNRmax) that are measured beforehand, the OSNRmin and the OSNRmax being the values of the OSNR of a channel n measured at an output terminal of the optical amplifier when a light source of a wavelength of the channel n is input to the optical amplifier at a minimum input optical power (Pmin) and a maximum input optical power (Pmax), respectively, and wherein the sender transmission apparatus uses an optical power value of channel n (Pn) to compute the ASE OSNR, where ASE OSNR =(OSNRmin) +((OSNRmax-OSNRmin)*(Pn-Pmin)) /(Pmax-Pmin), where Pmin <Pn <Pmax.

11. An optical signal to noise ratio calculation method employed in a wavelength division multiplexing (WDM) transmission system for transmitting a wavelength division multiplexed signal light from a sender transmission apparatus to a receiver transmission apparatus, the method comprising:
measuring an original optical signal to noise ratio (OSNR) of the signal light in the receiver transmission apparatus;
measuring an additional OSNR ascribed to a harmonic signal sideband of the signal light in the sender transmission apparatus; and
subtracting the additional OSNR from the original OSNR so as to compute a corrected OSNR of an amplified spontaneous emission (ASE) noise light with a reduction of an effect of the signal sideband which is considered as noise in the original OSNR of the signal light.

12. The optical signal to noise ratio calculation method of claim 11, further comprising:
  measuring the additional OSNR from the signal light sampled between a wavelength multiplexer and an optical amplifier in the sender transmission apparatus, with the wavelength multiplexer wavelength-multiplexing the signal light and the optical amplifier amplifying the signal light wavelength-multiplexed by the wavelength-multiplexer; and
  reporting the additional OSNR that is measured to the receiver transmission apparatus.

13. A wavelength division multiplexing (WDM) transmission apparatus for transmitting a wavelength division multiplexed signal light, the WDM transmission apparatus comprising:
  a wavelength multiplexer that wavelength-multiplexes a signal light;
  an optical amplifier that amplifies the signal light wavelength-multiplexed by the wavelength multiplexer before transmission by the WDM transmission apparatus;
  an optical branching unit, which branches the signal light between the wavelength multiplexer and the optical amplifier;
  a WDM monitor, which measures an optical signal to noise ratio of the signal light sampled at the optical branching unit; and
  a monitor control unit, which reports the optical signal to noise ratio measured by the WDM monitor to a signal light destination,
  wherein the monitor control unit is notified of a corrected optical signal to noise ratio with a reduction of an effect of a signal sideband considered as noise in the optical signal to noise ratio measured by the WDM transmission apparatus.

14. A wavelength division multiplexing (WDM) transmission apparatus for transmitting a wavelength division multiplexed signal light, the WDM transmission apparatus comprising:
  an optical amplifier that amplifies a transmitted signal light;
  an optical branching unit, which branches the signal light amplified by the optical amplifier; and
  a WDM monitor, which measures an original optical signal to noise ratio (OSNR) of the signal light sampled at the optical branching unit, wherein
  the apparatus subtracts from the original OSNR, measured by the WDM monitor, an additional OSNR ascribed to a harmonic signal sideband of the signal light provided from the source of the signal light so as to compute a corrected OSNR of an amplified spontaneous emission (ASE) noise light with a reduction of an effect of the signal sideband which is considered as noise in the original OSNR of the signal light.

\* \* \* \* \*